US011435475B2

(12) United States Patent
Hamlin et al.

(10) Patent No.: US 11,435,475 B2
(45) Date of Patent: Sep. 6, 2022

(54) INFORMATION HANDLING SYSTEM INFRARED PROXIMITY DETECTION WITH FREQUENCY DOMAIN MODULATION

(71) Applicant: Dell Products L.P., Round Rock, TX (US)

(72) Inventors: Daniel L. Hamlin, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 544 days.

(21) Appl. No.: 16/599,226

(22) Filed: Oct. 11, 2019

(65) Prior Publication Data

US 2021/0109214 A1 Apr. 15, 2021

(51) Int. Cl.
| | |
|---|---|
| *G01S 17/04* | (2020.01) |
| *G01S 17/10* | (2020.01) |
| *G01S 7/497* | (2006.01) |
| *G01S 7/48* | (2006.01) |
| *G01S 7/51* | (2006.01) |

(52) U.S. Cl.
CPC ............ *G01S 17/04* (2020.01); *G01S 7/4808* (2013.01); *G01S 7/497* (2013.01); *G01S 7/51* (2013.01); *G01S 17/10* (2013.01)

(58) Field of Classification Search
CPC combination set(s) only.
See application file for complete search history.

(56) References Cited

U.S. PATENT DOCUMENTS

| | | | |
|---|---|---|---|
| 7,714,265 | B2 | 5/2010 | Fadell et al. |
| 8,363,098 | B2 | 1/2013 | Rosener et al. |
| 8,593,277 | B2 | 11/2013 | Nath et al. |

(Continued)

FOREIGN PATENT DOCUMENTS

| | | |
|---|---|---|
| CA | 2027515 | 7/2000 |
| CA | 2838280 | 12/2012 |

(Continued)

OTHER PUBLICATIONS

Pidgeon, Elana, "Windows 10 Tip: How to Enable Focus Assist in the Windows Apr. 10, 2018 Update," downloaded from https://blogs.windows.com/windowsexperience/2018/05/09/windows-10-tip-how-to-enable-focus-assist-in-the-windows-10-april-2018-update/ Feb. 28, 2020, 7 pages.

(Continued)

*Primary Examiner* — Seung C Sohn
(74) *Attorney, Agent, or Firm* — Zagorin Cave LLP; Robert W. Holland (57) ABSTRACT

An information handling system manages operation of an infrared time of flight sensor to provide accurate and timely user presence and absence detection through modulation in the frequency domain of infrared light, such as by hopping or multiplexing through plural infrared frequencies sensed by the time of flight sensor. An application of the information handling system retrieves calibration information from the infrared time of flight sensor and applies the calibration information to select the plural infrared frequencies. If one or more predetermined conditions, such as a change in ambient light characteristics, the application commands an update of the calibration information to enhance user presence and absence detection.

20 Claims, 3 Drawing Sheets

(56) References Cited

U.S. PATENT DOCUMENTS

| | | | |
|---|---|---|---|
| 8,760,631 | B2 | 6/2014 | Ritter et al. |
| 9,378,342 | B2 | 6/2016 | Robison et al. |
| 9,672,627 | B1 | 6/2017 | Ramaswamy |
| 10,071,706 | B2 * | 9/2018 | Ette .................... B60R 25/2054 |
| 10,514,256 | B1 * | 12/2019 | Kamarshi ................ G01C 3/08 |
| 10,819,920 | B1 | 10/2020 | Hamlin |
| 2007/0139392 | A1 | 6/2007 | Kim |
| 2011/0310005 | A1 | 12/2011 | Chen |
| 2013/0346084 | A1 | 12/2013 | Archambault et al. |
| 2014/0085221 | A1 | 3/2014 | Kim |
| 2014/0109210 | A1 | 4/2014 | Borzycki et al. |
| 2014/0215248 | A1 | 7/2014 | Cheng |
| 2015/0085060 | A1 | 3/2015 | Fish |
| 2016/0127765 | A1 | 5/2016 | Robinson |
| 2017/0205876 | A1 | 7/2017 | Vidal |
| 2018/0275752 | A1 | 9/2018 | Peterson |
| 2018/0321731 | A1 | 11/2018 | Alfano et al. |
| 2019/0034609 | A1 | 1/2019 | Yang |
| 2020/0142471 | A1 | 5/2020 | Azam |
| 2020/0373810 | A1 | 11/2020 | Channaiah |
| 2021/0132769 | A1 | 5/2021 | Parikh et al. |

FOREIGN PATENT DOCUMENTS

| | | |
|---|---|---|
| CN | 103347437 | 10/2013 |
| EP | 2472424 | 7/2012 |
| WO | 2021047435 | 3/2021 |

OTHER PUBLICATIONS

Reddit, "Windows 10" Comments downloaded from https://www.reddit.com/r/Windows10/comments/9d7ohc/notifications_are_queued_up_and_displayed_in/ on Feb. 28, 2020, 2 pages.

U.S. Appl. No. 16/599,220, filed Oct. 11, 2019, entitled "Information Handling System Proximity Sensor with Mechanically Adjusted Field of View" to Inventors Daniel L. Hamlin et al.

U.S. Appl. No. 16/419,779, filed May 22, 2019, entitled "Augmented Information Handling System User Presence Detection" to Inventors Daniel L. Hamlin et al.

U.S. Appl. No. 16/599,222, filed Oct. 11, 2019, entitled "Information Handling System Infrared Proximity Detection with Distance Reduction Detection" to Inventors Daniel L. Hamlin et al.

U.S. Appl. No. 16/599,224, filed Oct. 11, 2019, entitled "Information Handling System Infrared Proximity Detection with Ambient Light Management" to Inventors Daniel L. Hamlin.

U.S. Appl. No. 16/778,787, filed Jan. 31, 2020, entitled "Information Handling System Notification Presentation Based Upon User Presence Detection" to Inventors Daniel L. Hamlin et al.

U.S. Appl. No. 16/778,798, filed Jan. 31, 2020, entitled "Information Handling System Peripheral Enhanced User Presence Detection" to Inventors Daniel L. Hamlin et al.

U.S. Appl. No. 16/778,805, filed Jan. 31, 2020, entitled "Information Handling System Adaptive User Presence Detection" to Inventors Daniel L. Hamlin et al.

* cited by examiner

INFORMATION HANDLING SYSTEM INFRARED PROXIMITY DETECTION WITH FREQUENCY DOMAIN MODULATION

BACKGROUND OF THE INVENTION

Field of the Invention

The present invention relates in general to the field of information handling system presence detection, and more particularly to an information handling system infrared proximity detection with frequency domain modulation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally process information with processing components disposed in a housing and present the information at a display. Desktop information handling systems typically present information as visual images at a peripheral display and accept end user inputs through peripheral input/output (I/O) devices, such as a keyboard and/or mouse. Portable information handling systems typically integrate a display and I/O devices into a portable housing along with a power source, such as a rechargeable battery. Generally, information handling systems include some sort of logic to power down a display if an end user is not viewing presented visual images. Powering down a display reduces power consumption, which increases battery life of portable systems, and increases security by enforcing password protection before again presenting visual images and permitting access to processing resources through I/O devices. Typical "screensaver" logic powers down a display and locks an information handling system after a preset timeout expires without an end user interaction. Generally, once a timeout expires an end user has to make an input at an I/O device to wake the system to input a password. Although this logic tends to save power and increase security, use of a hard timeout means that an end user has to balance the length of the timeout with the inconvenience of interruptions to system use. A typical screensaver timeout of fifteen minutes leaves a considerable window of non-use during which power is consumed and unauthorized access is available.

To provide improved power management and security, a variety of Human Presence Detection (HPD) sensors have been developed. One promising HPD sensor is an infrared time of flight (IRTOF) sensor. IRTOF sensors illuminate an area where an end user is expected, such as in front of a display that presents visual images, with an infrared light source and detects objects based upon time of flight of infrared reflections detected at the sensor. For instance, the IRTOF sensor scans the IR light source as a narrow beam across plural sectors to detect changes in distance to objects in each sector so that a detected object that moves over time indicates a human presence. IRTOF sensors provide a high degree of accuracy and sensitivity so that a very rapid response to user absence and presence is provided. Thus, as long as the IRTOF sensor detects an end user in the field of view, the system will not timeout so that the end user's viewing is not interrupted. If the IRTOF sensor fails to detect an end user in the field of view, a very rapid timeout may be enforced since the IRTOF sensor tends to have an accurate and rapid user absence detection. An aggressive timing configuration that quickly turns off a display and locks a system at user absence detection tends to decrease power consumption and increase system security.

One difficulty with IRTOF sensors is that rapid and highly sensitive detection of presence and absence risks the application of false user absence detections that result in end user interruptions of system use. Although IRTOF sensors are highly sensitive and accurate, variations in operating conditions can result in false user absent indications. For example, external sources of infrared light, such as ambient light levels and industrial point light source, can interfere with IRTOF sensor resolution resulting in false absent or false present indications. To avoid such interference, IRTOF sensors typically include a calibration process run at start-up that detects operating conditions and adjusts present and absent detection levels. For instance, in an environment having high levels of infrared interference, IRTOF sensors tend to have shorter detection ranges and less accuracy. The calibration process may include selection of an infrared frequency by the IRTOF sensor that provides reduced interference. A difficulty with such calibration is that environmental conditions change during information handling system operations, which can introduce variations in IRTOF sensor accuracy.

SUMMARY OF THE INVENTION

Therefore, a need has arisen for a system and method which adapts IRTOF sensor operations at an information handling system for improved end user presence and/or absence detection accuracy.

In accordance with the present invention, a system and method are provided which substantially reduce the disadvantages and problems associated with previous methods and systems for managing an IRTOF sensor at an information handling system to detect end user presence and/or absence. Infrared frequency calibration information is applied by an information handling system to adjust IRTOF sensor operations to provide more timely and accurate end user absence and presence detection indications.

More specifically, an information handling system processes information with a processor and memory for presentation at a display as visual images. An IRTOF sensor monitors a zone at the display associated with end user presence and absence and reports a presence or absence state to a proximity detection application running on the information handling system through a hardware and operating system interface, such as an integrated sensor hub that interfaces with an operating system driver. To avoid false user absence report disruption of end user interactions with the information handling system, the proximity detection application validates IRTOF sensor results by reference to calibration information retrieved from the IRTOF sensor. For instance, the proximity detection application applies frequency domain modulation of infrared sensing by the IRTOF sensor to validate a transition to a user absence state with sensing of user absence using plural infrared frequencies, such as by hopping or multiplexing between plural infrared frequencies. In one embodiment, the proximity detection application controls selection of infrared frequencies sensed by the IRTOF sensor. In another embodiment, the proximity detection application monitors other indications of end user presence and environmental conditions, such as ambient light and accelerations, to initiate re-calibration of the IRTOF sensor or other validation of user absence when reliability of the IRTOF sensor falls.

The present invention provides a number of important technical advantages. One example of an important technical advantage is that an IRTOF sensor provides more reliable and timely transitions between end user presence and absence indications that manage presentation of visual images by and access to an information handling system. By applying infrared calibration information at a system level to IRTOF component operations, reliability of the IRTOF sensor is improved for detection of user absence and presence detection. System level calls to and from the IRTOF sensor help to validate changes in user presence and absence states by sensing distances at plural selected infrared frequencies to avoid the effects of interference. Reliability of IRTOF sensor indications derived at a system level, such as by other indications of end user absence and presence and other indications of infrared interference, provides a basis for accepting user absence indications or performing additional user presence checks with operational changes at the IRTOF sensor initiated from a system level. As a result, more rapid and accurate indications of user presence and absence can be applied at an information handling system with less risk of end user disruptions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system manages an infrared time of flight (IRTOF) sensor with system commands to validate end user presence and absence detection by adjusting infrared frequency sensing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
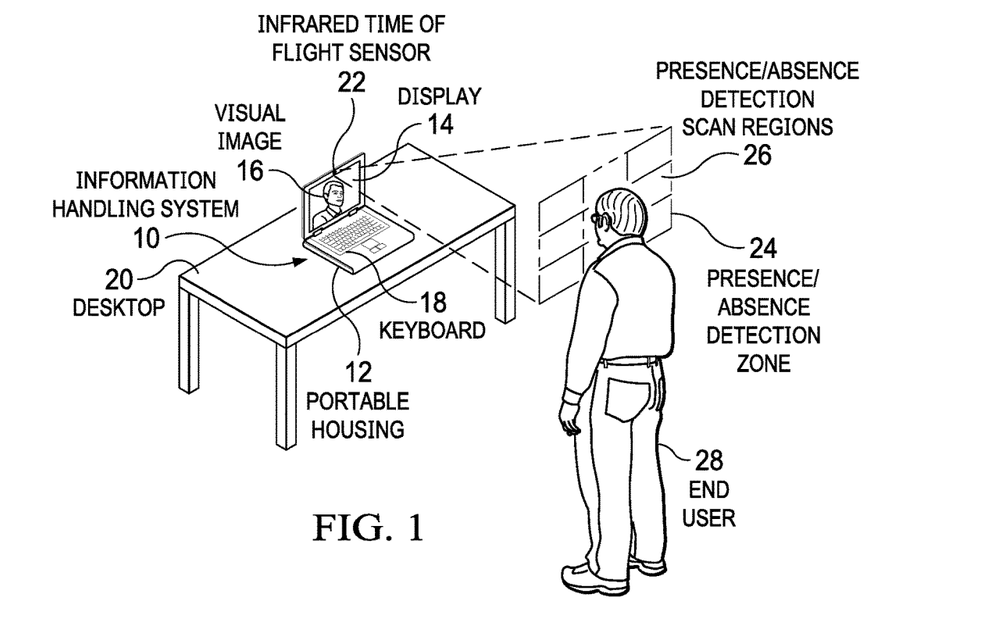
FIG. 1 depicts a portable information handling system monitoring an end user for presence and absence with an infrared time of flight (IRTOF) sensor.

Referring now to FIG. 1, a portable information handling system 10 monitors an end user 28 for presence and absence with an infrared time of flight (IRTOF) sensor 22. Information handling system 10 processes information with processing components disposed in a portable housing 12. In the example embodiment, portable housing 12 has rotationally coupled portions that rotate to a clamshell mode having a display 14 integrated in one housing portion raised to a vertical viewing position to present a visual image 16 over top of a keyboard 18 integrated in a second portion that rests on a desktop 20. End user 28 typically is within a limited distance of portable information handling system 10 when using the system. For instance, to type inputs at keyboard 18, end user 28 is within arm reach; to view visual image 16, end user 28 may have a slightly greater distance, depending on the size of display 14. Although the example embodiment depicts a portable information handling system, alternative embodiments may interact with desktop systems, peripheral displays and televisions.

IRTOF sensor 22 sends pulses of infrared light across a presence/absence detection zone 24 and detects reflections of the infrared light to determine a distance to objects, such as end user 28, within the presence/absence detection zone 24. For instance, IRTOF sensor 22 scans across plural presence/absence detection scan regions 26 in a scan pattern that detects a distance to an object in each region. Over time, animate objects are differentiated from inanimate objects by motion detected with changing distances to the objects in each region. When scan results of IRTOF sensor 22 indicates that a detected object is an end user, a presence detection is provided to the processing components of information handling system 10 so that visual image 16 stays active. When IRTOF sensor 22 indicates that the detected object has left, a user absence indication is provided to the processing components of information handling system 10 so that visual image 16 is removed, such as by powering down display 14. In addition, a user absence indication may be applied by information handling system 10 to lock the system so that it remains secure while end user 28 is not present.

IRTOF sensor 22 provides rapid and accurate user presence and absence detection to reduce power consumption and improve system security, however, if an inaccurate user absence detection is applied as a basis to power down display 14 when an end user is in fact present, the end user's interactions become disrupted. In some instances, IRTOF sensor 22 tends to lose accuracy so that false absence indications applied at information handling system 10 can disrupt end user interactions. For example, interference caused by ambient or point infrared light sources can impact the range and accuracy of IRTOF sensor 22. Generally, IRTOF sensors 22 perform a calibration at power up that attempts to quantify environmental conditions and select an IR frequency from plural available frequencies that will operate most accurately in a sensed environment. However, any number of factors can impact such a calibration, such as ambient light conditions or even the color shirt worn by an end user, so that a calibration at start tends to loss effectiveness over time. To maintain accurate user presence and absence detection, information handling system 10 tracks external conditions and adjusts IRTOF sensor 22 infrared sensing so that more accurate and validated user presence and absence are reported.

Figure 2:
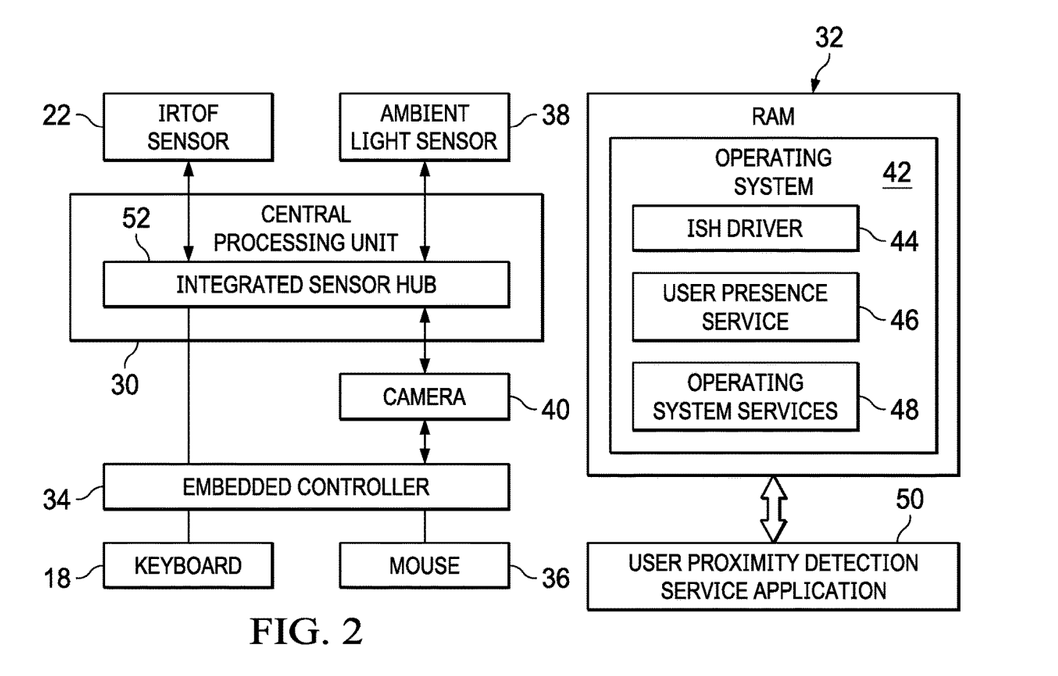
FIG. 2 depicts a block diagram of an information handling system having system level management of IRTOF sensor operations.

Referring now to FIG. 2, a block diagram depicts an information handling system 10 having system level management of IRTOF sensor 22 operations. In the example embodiment, a central processing unit (CPU) 30 executes instructions to process information stored in random access memory (RAM) 32. An embedded controller 34, such as a keyboard controller, manages system operations, such as by applying and removing power at CPU 30 and communicating inputs to CPU 30 from input/output (I/O) devices like keyboard 18 and mouse 36. Various types of peripheral devices and sensors may provide information to CPU 30, such as an ambient light sensor 38, which detects ambient light conditions that impacts display of visual images, and a camera 40, which captures images that may be used to support videoconferencing. In the various embodiments, sensor inputs to CPU 30 may be managed by embedded controller 34 or by sensor functionality integrated within CPU 30, such as the Integrated Sensor Hub (ISH) 52 provided in CPU architectures of INTEL. In the example embodiment, ISH 52 interfaces with and manages IRTOF sensor 22.

End user presence or absence states reported from IRTOF sensor 22 to ISH 52 are managed at a system level by an operating system 42 executing on CPU 30 from RAM 32, such as WINDOWS. In the example embodiment, an ISH driver 44 interfaces with ISH 52 to manage ISH 52 interactions with a user presence service 46 providing the ISH driver 44 with an interface for IRTOF sensor 22. The sensed conditions are provided through operating system services 48 to a user proximity detection service application 50, which applies presence and absence indications of IRTOF sensor 22 to power down a display and lock a system. User proximity detection service application 50 is, for example, installed through operating system 48 to distribute the drivers through the operating system and firmware that manages IRTOF sensor 22. As is set forth in U.S. patent application Ser. No. 16/419,779 by Daniel L. Hamlin; Timothy C. Shaw; Vivek Viswanathan Iyer; Allen B. McKittrick, filed on May 22, 2019, entitled Augmented Information Handling System User Presence Detection, and incorporated herein as if fully set forth, a variety of other factors may also be considered when applying user presence and absence indications, such as inputs made by an end user and other conditions that indicate end user presence and absence.

Figure 3:
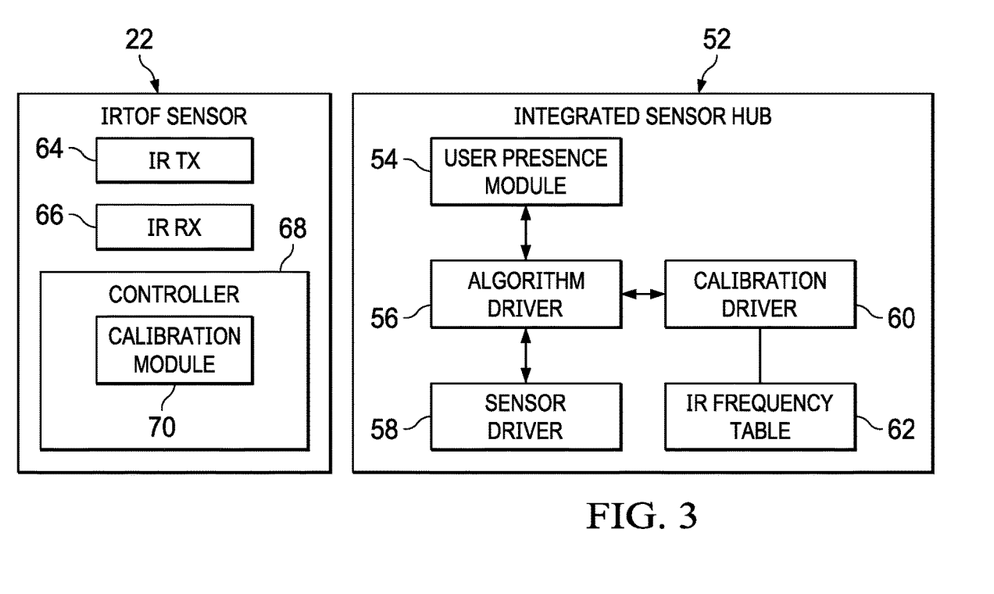
FIG. 3 depicts an example embodiment of logic in an integrated sensor hub that manages IRTOF sensor operations.

Referring now to FIG. 3, an example embodiment depicts logic in an integrated sensor hub 52 that manages IRTOF sensor 22 operations, such as with modules of firmware code stored in flash memory of ISH 52. ISH 52 interfaces with IRTOF sensor 22, such as through an I2C low speed communication link or GPIO, to receive sensed information and configure sensor operations. A sensor driver 58 interfaces with IRTOF sensor 22 to receive data and provides the processed data to an algorithm driver 56 that computes a probability that a user is present and then advertises the results through a user presence module 54 to any subscribed services. IRTOF sensor 22 includes an infrared transmitter (IR TX) 64 that generates infrared illumination and an infrared receiver (IR RX) 66 that receives infrared illumination, including both reflected transmissions of infrared light and interference infrared light from ambient sources. A controller 68 controls IR transmitter 64 and IR receiver 66 to command a scan across a user detection field of view. Controller 68 includes firmware instructions in a calibration module 70 that execute to calibrate IRTOF sensor 22 to the environmental conditions. One function of calibration module 70 at power up is to test IR RX 66 at plural infrared frequencies to determine which of the plural frequencies will provide the best detection. Infrared frequencies may be adjusted at IR transmitter 64 or IR transmitter 64 may transmit a broad spectrum of infrared light that IR receiver 66 scans in narrow tuned spectrums selected by controller 68.

A calibration driver 60 executing as a firmware module in ISH 52 interfaces with controller 68 to retrieve calibration information generated by calibration module 70 to store the calibration information in a IR frequency table 62. Once IRTOF sensor 22 is active monitoring for absence and presence detection, calibration driver 60 monitors IRTOF sensor 22 output to modify IRTOF sensor 22 operations by reference to IR frequency table 62 as needed to validate presence and absence detection before reporting to the operating system. Calibration information can take a number of different forms and may involve active manipulation of IRTOF sensor 22 from ISH 52 to generate additional calibration information as needed. For instance, in one example embodiment, calibration driver 60 downloads a ranked order list of IR frequencies from controller 68 based upon detected interference at startup. In another embodiment, calibration driver 60 commands IRTOF sensor 22 to detect an object with each of plural available IR frequencies and rank orders the IR frequencies based upon returned results, such as the distance reported by each frequency. For example, a closer distance indicates a stronger signal and less interference. Calibration driver 60 can initiate a test of all or part of the available IR frequencies at any time without having to interrupt detection of objects with a restart or re-calibration by controller 68. Thus, if a change in ambient light is detected at a system level, an abbreviated distance check across different IR frequencies can validate IRTOF sensor 22 operations without interruption of presence or absence detection.

In addition to management of IRTOF sensor 22 with logic embedded in ISH 52, the operating system and applications executing on CPU 30 may provide additional and higher order management logic. For instance, machine learning may monitor IRTOF sensor 22 presence and absence indications for accuracy, such as based on other system inputs, and relate the reliability of presence and absence indications to other factors. In one example embodiment, machine learning determines an optimal set of a number N infrared frequencies to hop or multiplex through to optimize user presence and absence detection. In some environments with high reliability, calibration driver may allow IRTOF sensor 22 to operate autonomously. If the user proximity detection service application detects less optimal conditions, such as based upon an indoor or outdoor location, various ambient light color temperatures and/or brightness, a passive viewing user who consumes presented information without making inputs, or other conditions, it may command calibration driver 60 to use different numbers of infrared frequencies in a hopping pattern to validate user absence detection. In such an embodiment, the number of infrared frequencies may increase as the environmental conditions reduce IRTOF sensor 22 reliability. The number of infrared frequencies may adapt in real time based upon feedback of performance with false detects and false misses. In one embodiment, infrared frequencies may be swept in a time division multiplexing manner. Alternatively, infrared frequencies are swept with multiple sensor beams in a code division multiplexed manner or a frequency division multiplexing manner. In each example, system level management of IRTOF sensor operations is selectively enforced to optimize user presence and absence detection based upon factors that influence infrared sensor operations and that are not directly discernable at the IRTOF sensor itself.

Figure 4:
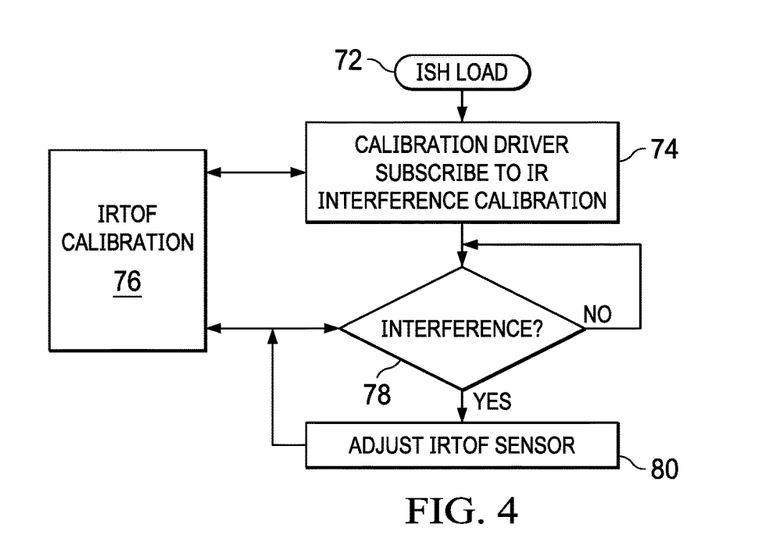
FIG. 4 depicts a flow diagram of a process for managing IRTOF sensor operations at a system level.

Referring now to FIG. 4, a flow diagram depicts a process for managing IRTOF sensor operations at a system level. The process starts at step 72 with loading and execution at ISH 52 of the IRTOF management firmware. At step 74, the calibration driver of the ISH subscribes to infrared interference calibration information generated at 76 with power up of the IRTOF sensor, such as an ordered list of infrared frequencies or raw data from reading ambient infrared illumination at each of the plural available infrared frequencies. The IRTOF sensors after start and calibration proceeds to monitor for user presence and absence. At step 78, a determination is made of whether infrared interference has impacted the operation of the IRTOF sensor. The determination at step 78 may include sensed information from the IRTOF sensor, erratic or otherwise unreliable presence and absence detection, ambient light detected by an ambient light sensor, images captured by a camera, end user inputs or accelerations indicating presence when the IRTOF sensor indicates absence or other factors. If no interference is determined, system continues back to step 78 to monitor for interference. If interference is detected, the process continues to step 80 to adjust the IRTOF sensor operations to adapt to the interference. In one embodiment, the ISH commands a change of the infrared frequency, such as by selecting the next most clear infrared frequency determined at calibration. In one example embodiment, the ISH may command periodic hopping of the infrared frequency used by the IRTOF sensor. In another example embodiment, the ISH may command multiplexing of the infrared frequencies used to detect presence and absence, such as by cycling through two or more of the plural available infrared frequencies at each presence/absence scan. ISH commanded adjustments to infrared frequency selection may be a one-time command as interference is detected or adaptive real-time commands tied to re-calibrations initiated by the ISH.

Figure 5:
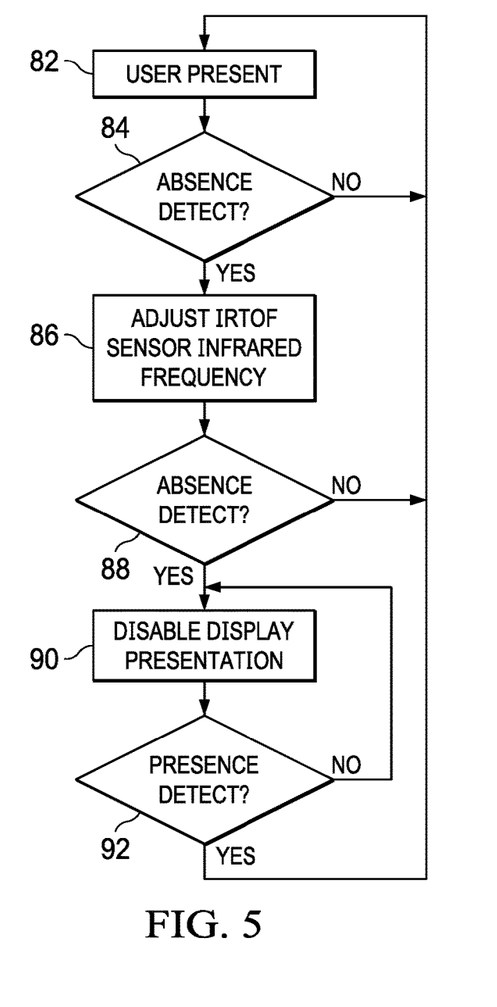
FIG. 5 depicts a flow diagram of a process for altering IRTOF infrared frequencies to validate end user absence and presence detection.

Referring now to FIG. 5, a flow diagram depicts a process for altering IRTOF infrared frequencies to validate end user absence and presence detection. The process starts at step 82 with a user present indication. At step 84 a determination is made of whether a user absent detection is made. If not, the process returns to step 82 to continue monitoring for user present detection. If a user absent is detected at step 84, the process continues to step 86 to adjust the IRTOF sensor infrared frequency. For instance the ISH commands a change of the IRTOF frequency to the next most sensitive infrared frequency stored at the calibration. At step 88, a determination is again made of whether a user is present or absent, this time with the IRTOF sensor operating at the adjusted infrared frequency. If a user presence is detected, the process returns back to step 82 to continue normal monitoring. If a user absence is validated at step 88, the process continues to step 90 to disable display presentation and perform other user absent configured actions. At step 92, monitoring is performed for user presence detection until, after a user presence is detected, the process returns to step 82.

Figure 6:
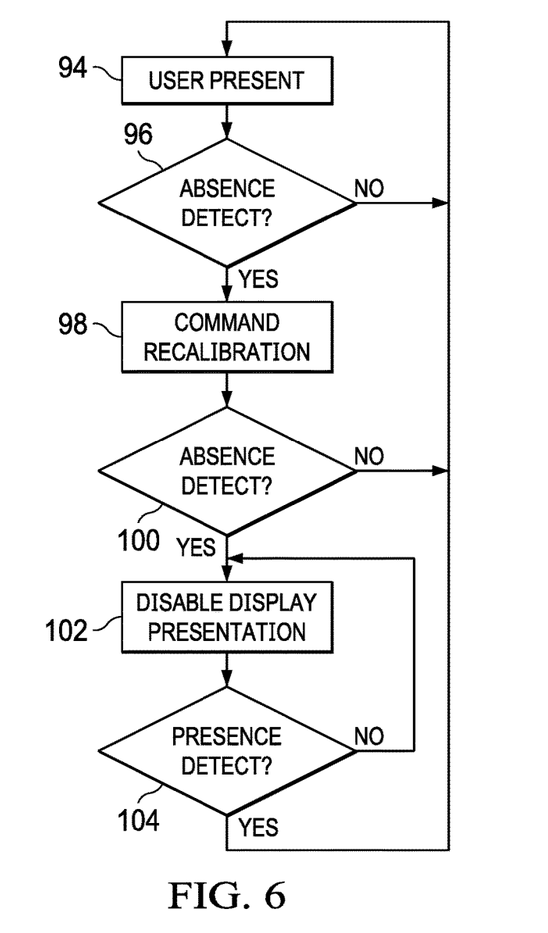
FIG. 6 depicts a flow diagram of an alternative embodiment of a process for altering IRTOF infrared frequencies to validate end user absence and presence detection.

Referring now to FIG. 6, a flow diagram depicts an alternative embodiment of a process for altering IRTOF infrared frequencies to validate end user absence and presence detection. The process starts at step 94 with a user presence detection. At step 96 a determination is made of whether a user absence is detected and, if not, the process returns to step 94 to continue monitoring for user presence. If at step 96 user absence is detected, the process continues to step 98 to command a re-calibration at the IRTOF sensor. The re-calibration can be a restart or GPIO command to the IRTOF sensor that initiates calibration as if at start. Alternatively, re-calibration can be a stepping through infrared frequencies by the ISH to determine a distance detected to an object, if any, at each frequency. Once re-calibration is complete, the process continues to step 100 to detect presence or absence. If user presence is detected, the process returns to step 94. If user absence is validated, the process continues to step 102 to disable the display and perform any other user absent configured functions. The process then proceeds to step 104 to continue monitoring for user presence. By adjusting infrared frequencies in response to a user absence detection, the ISH validates the user absence on multiple infrared frequencies before taking user absence actions so that the risk of disruption to an end user is reduced.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions that process information;
   a memory disposed in the housing and interfaced with the processor, the memory operable to store the instructions and information;
   an embedded controller interfaced with the processor and operable to manage inputs provided from one or more input devices for communication to the processor;
   a display interfaced with the processor and operable to present the information as visual images;
   an infrared time of flight sensor disposed in the housing and configured to detect user presence and absence by illuminating an area proximate the display with an infrared source and sensing infrared light reflected by an object to determine a distance to the object, the infrared time of flight sensor having a calibration logic that selects an infrared frequency from plural infrared frequencies for the infrared time of flight sensor to sense; and
   a proximity detection service interfaced with the infrared time of flight sensor and operable to selectively enable and disable presentation of visual images at the display at least in part based upon detection of user presence and user absence, the proximity detection service further operable to command the infrared time of flight sensor to adjust the selected infrared frequency between the plural infrared frequencies based upon one or more predetermined conditions.

2. The information handling system of claim 1 wherein: the predetermined condition comprises a change from user present to user absent reported by the infrared time of flight sensor to the proximity detection service; and the proximity detection service commands a frequency hop from the selected infrared frequency to another of the plural infrared frequencies in response to the change from user present to user absent.

3. The information handling system of claim 2 wherein the proximity detection service maintains presentation of visual information if user present is detected at the another of the plural infrared frequencies and disables user present if user absent is detected at the another of the plural infrared frequencies.

4. The information handling system of claim 1 wherein the proximity detection service commands the infrared time of flight sensor to adjust the selected infrared frequency by multiplexing between the plural infrared frequencies.

5. The information handling system of claim 1 wherein the proximity detection service commands the infrared time of flight sensor to adjust the selected infrared frequency by hopping between the plural infrared frequencies.

6. The information handling system of claim 1 wherein the proximity detection service commands the infrared time of flight sensor to adjust the selected infrared frequency by commanding a re-calibration.

7. The information handling system of claim 1 wherein the proximity detection service:
commands a calibration at each of the plural infrared frequencies;
stores a calibration ranking for each of the plural infrared frequencies; and
commands adjusting the selected infrared frequency based upon the calibration ranking.

8. The information handling system of claim 1 wherein the proximity detection service:
monitors for inputs at the one or more input devices;
validates the infrared time of flight sensor user absence detection by reference to the inputs; and
commands a change of the infrared frequency if the inputs fail to validate the user absence detection.

9. The information handling system of claim 8 wherein the proximity detection service:
disables presentation of visual images when the inputs validate the user absence detection;
maintains presentation of visual images when the inputs fail to validate the user absence detection; and
disables presentation of visual images when the infrared time of flight sensor detects user absence with the change of infrared frequency.

10. A method for detecting user absence at an information handling system, the method comprising:
monitoring proximate a display of the information handling system with an infrared time of flight sensor at a first infrared frequency for a user absence state;
detecting the user absence state with the first infrared frequency;
in response to the detecting, commanding the infrared time of flight sensor to set a second infrared frequency;
monitoring proximate the display of the information handling system with the infrared time of flight sensor at the second infrared frequency for a user absence state;
detecting the user absence state with the second infrared frequency; and
disabling presentation of information at the display in response to the user absence state detected by the infrared time of flight sensor with both the first and second frequencies.

11. The method of claim 10 wherein the commanding the infrared time of flight sensor to set a second infrared frequency further comprises commanding a re-calibration of the infrared time of flight sensor.

12. The method of claim 11 wherein the commanding the infrared time of flight sensor further comprises commanding the infrared time of flight sensor to the second infrared frequency selected by the information handling system from calibration information stored at the information handling system.

13. The method of claim 12 further comprising:
detecting with the first infrared frequency a first distance to an object;
storing the first distance at the information handling system as calibration information;
detecting with the second infrared frequency a second distance to the object;
storing the second distance at the information handling system as calibration information; and
comparing the first and second distances at the information handling system to determine a sensitivity associated with the infrared time of flight sensor.

14. The method of claim 10 further comprising:
calibrating the infrared time of flight sensor at power up of the infrared time of flight sensor to generate calibration information;
retrieving calibration information from the infrared time of flight sensor to an application executing on a processor of the information handling system;
analyzing the calibration information with the application; and
selecting the first and second infrared frequencies with the application.

15. A method for monitoring user absence at an information handling system, the method comprising:
presenting information processed by the information handling system as visual images at a display;
disposing an infrared time of flight sensor aligned to monitor a user viewing position proximate the display;
retrieving from the infrared time of flight sensor to an application executing on the information handling system calibration information of the infrared time of flight sensor at plural infrared frequencies;
detecting a transition from user presence to user absence with the infrared time of flight sensor;
commanding with the application plural infrared frequencies at the infrared time of flight sensor; and
confirming user absence with at least first and second of the plural infrared frequencies before applying the user absence to disable the presenting.

16. The method of claim 15 further comprising:
selecting at least first and second of the plural infrared frequencies based upon calibration information retrieved from the time of flight sensor; and
hopping between the first and second infrared frequencies at a rate determined by the application.

17. The method of claim 15 further comprising:
performing a calibration at power up of the infrared time of flight sensor to generate calibration information associated with the plural infrared frequencies;
retrieving the calibration information to the application; and
selecting the first and second frequencies with the application.

18. The method of claim 17 further comprising:
monitoring ambient light with an ambient light sensor disposed at the information handling system; and
in response to a predetermined ambient light condition, commanding re-calibration of the infrared time of flight sensor.

19. The method of claim 15 further comprising:
retrieving to the application a distance to an object detected by the infrared time of flight sensor at each of the plural infrared frequencies; and
selecting the first and second infrared frequencies based on the distances.

20. The method of claim 19 further comprising:
monitoring ambient light conditions at the information handling system;
detecting a predetermined change in the ambient light conditions;
in response to the detecting, commanding the time of flight sensor to determine the distance to the object at each of the plural infrared frequencies;
retrieving the distances to the application; and
re-selecting the first and second infrared frequencies based on the distances.

* * * * *